US 9,160,739 B2

(12) United States Patent
McDowell-White

(10) Patent No.: US 9,160,739 B2
(45) Date of Patent: Oct. 13, 2015

(54) SECURE DATA TRANSMISSION SYSTEM

(71) Applicant: Invisible Text, LLC, Los Angeles, CA (US)

(72) Inventor: Desiree Gina McDowell-White, Los Angeles, CA (US)

(73) Assignee: Invisible Text, LLC, Los Angeles, CA (US)

( * ) Notice: Subject to any disclaimer, the term of this patent is extended or adjusted under 35 U.S.C. 154(b) by 178 days.

(21) Appl. No.: 13/897,865

(22) Filed: May 20, 2013

(65) Prior Publication Data

US 2014/0157430 A1    Jun. 5, 2014

Related U.S. Application Data

(60) Provisional application No. 61/795,804, filed on Oct. 26, 2012, provisional application No. 61/688,712, filed on May 21, 2012.

(51) Int. Cl.
*G06F 17/30*     (2006.01)
*H04L 29/06*     (2006.01)

(52) U.S. Cl.
CPC .......... *H04L 63/083* (2013.01); *H04L 63/0884* (2013.01); *H04L 63/101* (2013.01)

(58) Field of Classification Search
CPC .. H04L 63/083; H04L 63/101; H04L 63/0884
USPC .......................................................... 726/27
See application file for complete search history.

(56) References Cited

U.S. PATENT DOCUMENTS

| 2005/0108621 A1* | 5/2005 | Kim et al. ................. 715/500 |
| 2010/0107225 A1* | 4/2010 | Spencer et al. ................ 726/4 |
| 2012/0213085 A1* | 8/2012 | Koren et al. ................ 370/241 |

\* cited by examiner

*Primary Examiner* — Baotran N To
(74) *Attorney, Agent, or Firm* — David L. Nocilly; Bond Schoeneck & King, PLLC

(57) ABSTRACT

A secure messaging system that requires pairing of second and receiving devices via user identification credentials and the associated media access control addresses (MAC addresses) of the paired devices. Paired devices may communicate encrypted messages and deletion parameters may be established by a sending device, including immediate deletion requests. The message and the instructions are automatically decrypted by the receiving device and interpreted to provide the data and configure the deletion parameters. The system preferably manages device pairing via a remote server that is accessed by a device application.

13 Claims, 5 Drawing Sheets

SECURE DATA TRANSMISSION SYSTEM

CROSS-REFERENCE TO RELATED APPLICATIONS

The present application claims priority to U.S. Provisional Patent Application No. 61/795,804, filed on Oct. 26, 2012 and U.S. Provisional Application No. 61/688,712, filed on May 21, 2012.

BACKGROUND OF THE INVENTION

1. Field of the Invention

The present invention relates to data transmission systems and, more particularly, to a system that provides identity and data theft protection.

2. Description of the Related Art

Messaging over the internet and mobile cellular networks has been growing at an astonishing rate over the last decade, and includes the transmission of additional date, such as sound, video, and picture files. A primary concern in the use of messaging systems is the security and integrity of such data transmission. While some solutions exist that perform encryption on transmitted data or require encryption keys, there is no way to know whether the receiving party is the intended target or whether a third party with unauthorized access has intercepted or broken the encryption. In addition, there is typically no way to ensure that the receiving party deletes sensitive messages or data as promised. Accordingly, there is a need in the art for a data transmission system that can verify the receiving party is authorized to receive the transmission and is actually the authorized party prior to data transmission, and that can ensure the appropriate deletion of received data after transmission.

BRIEF SUMMARY OF THE INVENTION

The present invention comprises a secure messaging system that provides identity and data theft protection by requiring that devices participating in the transmission of data be paired via an exchange of media access control addresses (MAC addresses). By requiring the pairing of devices via exchanged MAC addresses before data can be transferred between devices, data transmission security is enhanced. In an embodiment of the present invention, sent data may also be deleted from a receiving device after it has been reviewed, such as by a remote sender, thereby further ensuring data security and protecting against identity theft. In the data transmission process according to the present invention, a request to transmit data, such as encrypted text, an image, sound, video, or music file, a check is first made to determine whether the sending and receiving devices have been paired. For example, a check may be made via a host server.

Once a paired relationship has been verified, data is sent to the receiving device in encrypted fashion along with instructions on how long the message is to be made available for viewing before automatic deletion. The message and the instructions are automatically decrypted by the receiving device and interpreted to provide the data and configure the deletion parameters. Alternatively, a sending device may transmit a delete instruction that deletes a received data file regardless of whether the file was reviewed, viewed or used.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
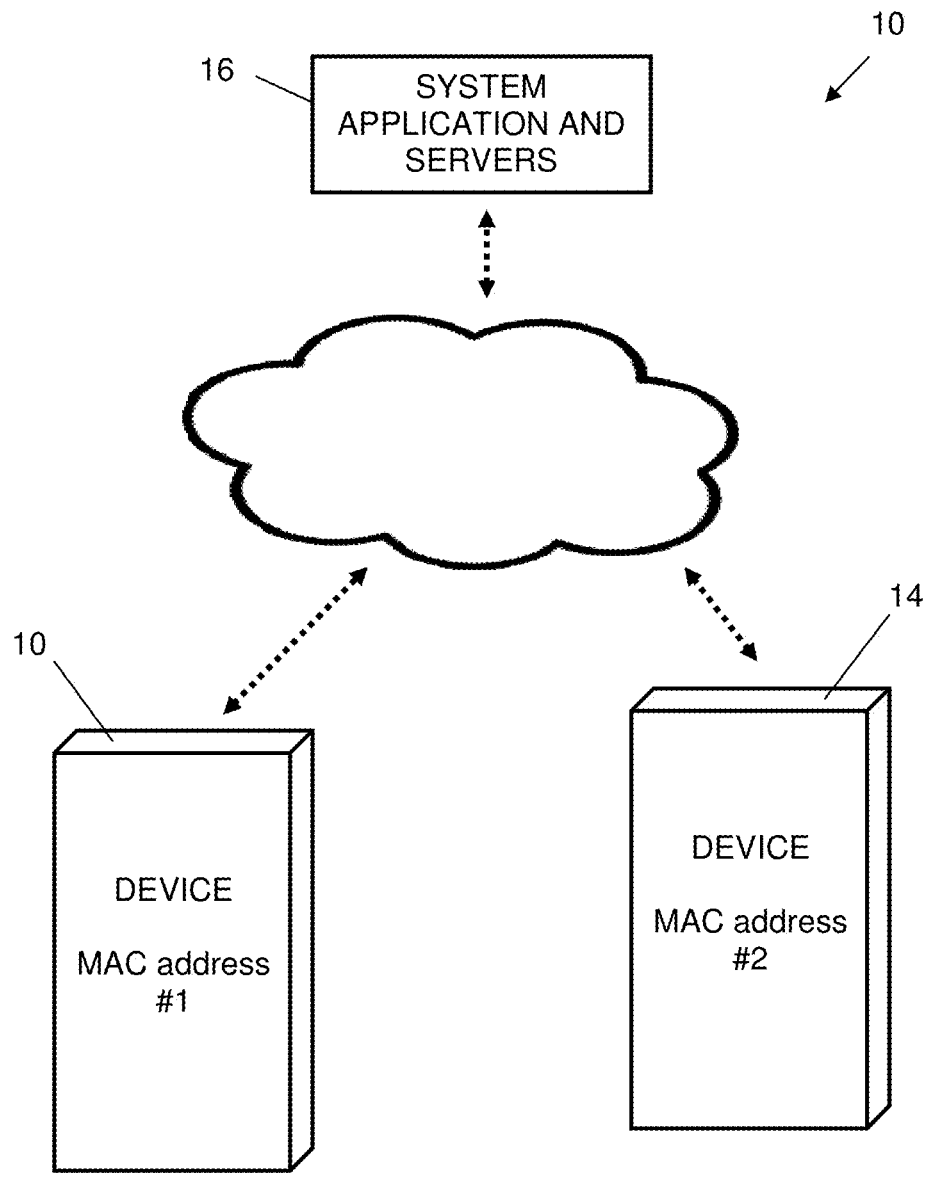
FIG. 1 is a schematic of a secure messaging system according to the present invention implemented into two smart phones.

Referring now to the drawings, wherein like reference numerals refer to like parts throughout, there is seen in FIG. 1 a schematic of the secure messaging system 10 according to the present invention that is based in part on pairing of devices 12 and 14 using MAC addresses, with are device identifiers that are each uniquely associated with a network adapter to identify a device on a network. A typical MAC address consists of 12 hexadecimal numbers, typically formatted as follows XX:XX:XX:YY:YY:YY. System 10 is designed to allow for the secure pairing of a sending (or receiving) device 12 running system 10 with a receiving (or sending) device 14 also implementing system 10. It should be recognized by those of skill in the art that a device implementing system 10 may act as either a sending device 12 or a receiving device 14, or both, and have been assigned reference numerals as one or the other strictly for the purposes of illustrating an embodiment of the invention. System 10 ensures that messages are sent to the correct person/device and that the sender is the person authorized to make the transmission.

As seen in FIG. 1, a host server 16 facilitates system 10 in combination with devices 12 and 14, preferably through the use of software installed on participating devices 12 and 14, such as an application that is downloaded and run on the sending and receiving devices 12 and 14 that will be participating in data transmission or messaging. For example, the local device portions of system 10 may be implemented via a downloadable app for devices such as smartphones, tablets, laptops, desktop computers, as well as gaming systems, smart televisions, navigation systems, vehicular computers, and the like. Along these lines, system 10 can be configured to require a conventional user identification and password for each user to provide added security and, as explained below, for a user to remotely access host 16, such as if a participating device 12 or 14 is lost.

Figure 2:
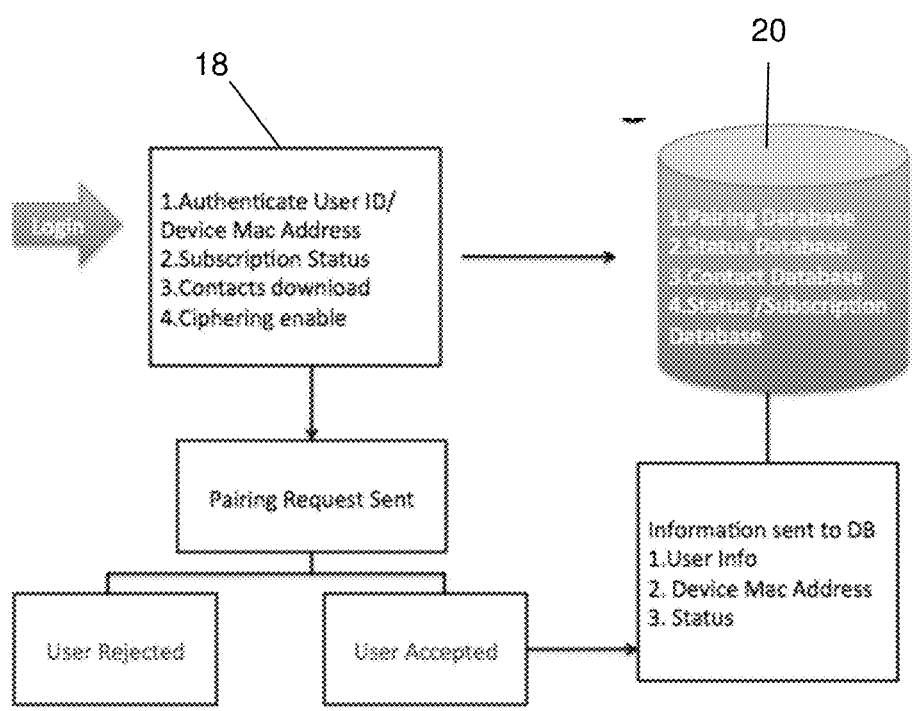
FIG. 2 is a schematic of a user device management module according to the present invention.

Referring to FIG. 2, system 10 contains a device management module 18 that manages authentications, subscriptions, user contacts, and ciphering, and is in communication with a database 20 for storing and retrieving data associated with the various processes. Preferably, database 20 is maintained remotely from devices 12 and 14 for additional security, such as in the "cloud" as that term is used in the field to refer to remotely positioned storage accessible via the internet. Preferably, messages themselves are not retained in database 20 to improve security. For example, a user may request remote pairing with a particular contact stored within database 20 by using management module 18 to retrieve the contact from database 20. System 10 then communicates the pairing request, which may be rejected or accepted by device 14. If accepted, the MAC addresses are shared between the host files associated with devices 12 and 14, and thus stored in the corresponding database files associated with the other device along with appropriate user identification (ID) information.

Figure 3:
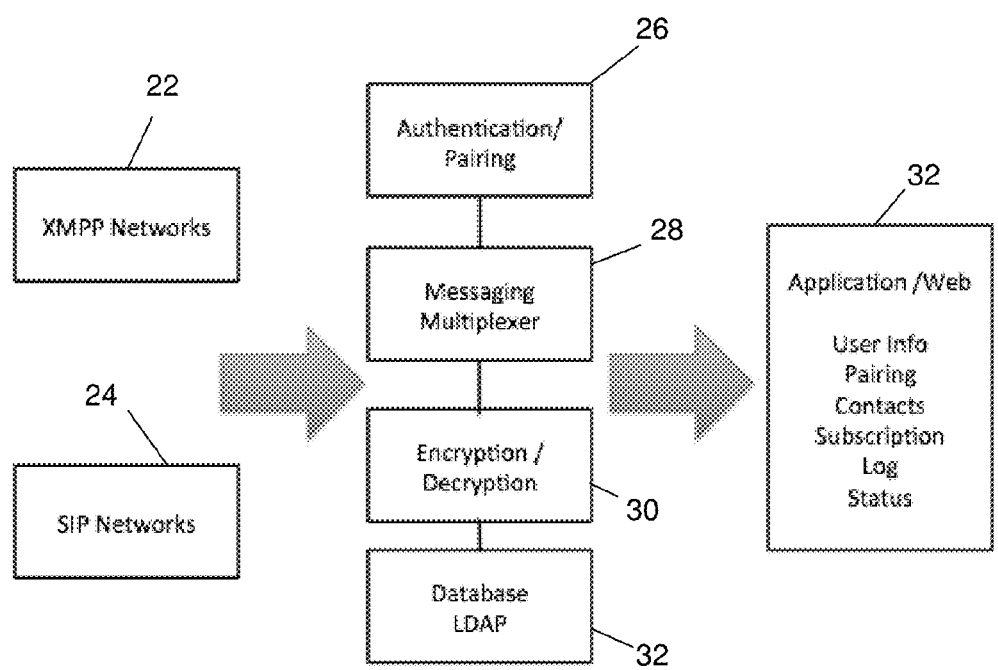
FIG. 3 is a schematic of data flow in a secure messaging system according to the present invention.

As seen in FIG. 3, system 10 may be configured to operate over Extensible Messaging and Presence Protocol (XMPP) 22 or Session Initiation Protocol (SIP) 24 based networks, and includes module for performing authentication/paring 26, messaging multiplexing 28, encryption/decryption, and an LDAP database 30. System 10 further includes an application/web module 32 for retrieving and using user information, pairing relationships, contacts, subscriptions, logs, and status information.

Figure 4:
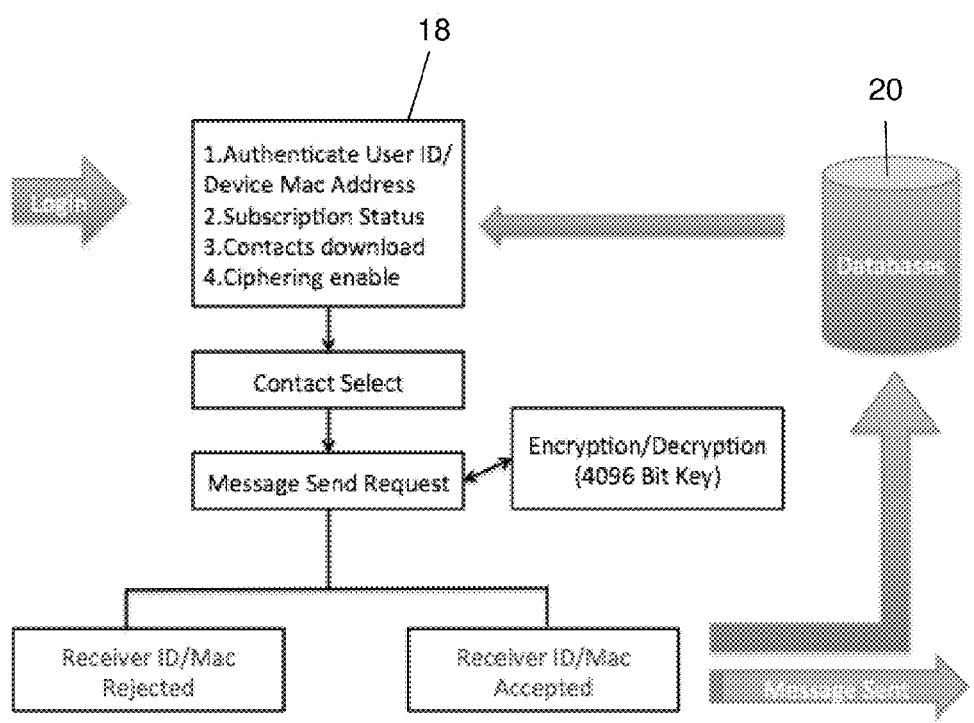
FIG. 4 is a schematic of message sending and receiving according to the present invention.

After at least one pair is achieved and stored in database 20, a data transmission may be made using system 10. For example, as seen in FIG. 4, a user can select a contact from management module 18 and send a message that is encrypted by system 10. If the receiving device's MAC address and user ID information are confirmed based on pre-configured pairing information in database 20, the message is sent from sending device 12 to the receiving device 14 via system 10. Thus, messages pass through system 10, which acts as a postmaster, and not directly between the devices.

Figure 5:
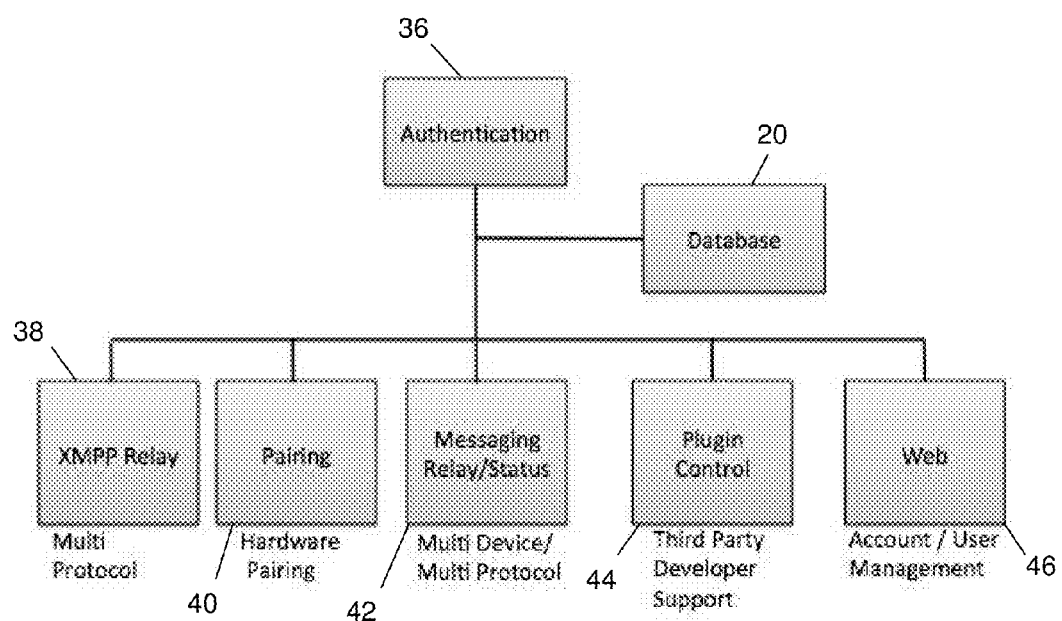
FIG. 5 is a schematic of the hierarchy of servers according to the present invention.

Referring to FIG. 5, system 10 employs a hierarchy of servers to accomplish securing message transmissions. More particularly, an authentication server 36 having access to database 20 is in communication with an XMPP relay server 38, a pairing server 40, a messaging relay status server 42, a plug-in control server 44, and a web server 46. System 10 may thus be used to provide user identification, such as in connection with a voice or video conferencing session, wherein one or more sessions are started by the participants. For example, the identity of the user/participants may be confirmed by checking the device MAC addresses of users after they have logged into the program.

System 10 may further be programmed to control the amount of time that secure messages are available to the receiving device. For example, each message may be accompanied by a deletion parameter that is set by sending device 12 and specifies when the message is to be automatically deleted by the receiving device 14. In an additional embodiment of the present invention, sending device 12 may remotely set the deletion trigger to cause immediate deletion of the message regardless of the status of the message on receiving device 14, i.e., a message may be deleted before it has been read or viewed.

In a preferred embodiment of the present invention, system 10 employs the hierarchy of FIG. 5 to avoid the need for storage of data involved in the secure transmission. For example, picture, video, sound, and data files may be transmitted between and viewed using devices using system 10. By not retaining the data associated with messaging files in device 12 or 14, such as deleting or flushing immediately or as directed by users, such as after the messages have been read or accessed, there is total privacy and integrity during paired conversations. System 10 may further be programmed to allow a user to remotely disable paired connection. For example, a user that loses device 12 may access system 10 via the internet using the web server of system 10 to delete all paired connections from system 10.

What is claimed is:

1. A method of securely transmitting messages between electronic devices, comprising:

receiving a request to send a message from a sending device having a first media access control (MAC) address to a receiving device having a second MAC address;

confirming that said first MAC address of said sending device matches at least said one of a predetermined plurality of unique MAC addresses associated with a corresponding plurality of registered electronic devices and stored in memory, wherein each of said predetermined plurality of unique MAC addresses associated with a corresponding plurality of registered electronic devices have been paired with at least another of predetermined plurality of unique MAC addresses;

confirming that said second MAC address of said receiving device matches another one of said predetermined plurality of unique MAC addresses in said memory;

confirming that said first MAC address of said sending device has been paired with said second MAC address of said receiving device;

confirming that a first username and password associated with said sending device matches a previously registered username and password associated with the first MAC address of said sending device;

encrypting said message using a second username and password of the receiving device and the second MAC address of the receiving device if the first username and password of said sending device matches the previously registered username and password associated with the first MAC address of said sending device; and forwarding said encrypted message from said sending device to said receiving device only if said first and second MAC addresses and said first and second usernames and passwords are confirmed as having matches in said memory and said first and second MAC addresses have been paired, and not forwarding said message if said first and second MAC addresses and said first and second usernames and passwords are not confirmed as having matches in said memory and said first and second MAC addresses have not been paired.

2. The method of claim 1, further comprising the step of pairing at least one of said predetermined plurality of unique MAC addresses with another of said predetermined plurality of unique MAC addresses in response to a pairing request received from a requesting device having one of said predetermined plurality of unique MAC addresses that is forwarded to and accepted by another of said plurality of registered devices.

3. The method of claim 2, further comprising the step of terminating said pairing at request of either device involved in said pairing.

4. The method of claim 1, wherein said encrypted message further comprises a deletion parameter that specifies how long said encrypted message is to be retained by said receiving device.

5. The method of claim 1, further comprising the step of causing the deletion of said encrypted message from said receiving device in response to a deletion request from said sending device.

6. The method of claim 1, wherein the step of registering at least one of said predetermined plurality of unique MAC addresses associated with a corresponding plurality of registered electronic devices further comprises the step of requiring the presence of downloadable software on each electronic device to be registered.

7. A system for securely transmitting messages between electronic devices, comprising:

a memory having a database containing a plurality of media access control (MAC) addresses uniquely corresponding with a plurality of electronic devices;

a server programmed to establish at least one pairing between two or more of said electronic devices and save said pairing relationship with said database, to confirm that a first username and password of a sending device having a first MAC address matches a previously registered username and password associated with the first MAC address of said sending device, to encrypt a message using a second username and password of a receiving device and a second MAC address of the receiving device if the first username and password of said sending device matches a previously registered username and password associated with the first MAC address of said sending device, to forward said encrypted message from the sending device to the receiving device having the second MAC address if said database contains said sending device and said receiving device have a previously established pairing relationship based on said first and second MAC addresses and said first and second usernames and passwords are confirmed as having matches, and to not forward said message if said first and second MAC addresses and said first and second usernames and passwords are not confirmed as having matches in said memory and said first and second MAC addresses have not been paired.

8. The system of claim 7, wherein said server is programmed to establish at least one pairing by forwarding a request from a first device registered in said database to a second device registered in said database and receiving from said second electronic device an acceptance or denial of said request.

9. The system of claim 8, wherein said server is further programmed to terminate said pairing at request of any device within said pairing relationship.

10. The system of claim 7, wherein said server is further programmed to add a deletion parameter to said encrypted message to notify said second device to delete said message after a predetermined time.

11. The system of claim 7, wherein said server is further programmed to remotely delete said encrypted message from said second device after a predetermined time.

12. The system of claim 7, wherein said database stores, along with each MAC address, a username and password associated with each of said electronic devices in said database.

13. The system of claim 7, wherein said server is further programmed to require the presence of downloadable software on each device stored in said database.

* * * * *